United States Patent [19]

Yananton et al.

[11] Patent Number: 4,800,841

[45] Date of Patent: * Jan. 31, 1989

[54] CARDBOARD CONTAINER WITH LITTER PAD

[76] Inventors: Patrick Yananton, 1518 Little Hill Rd., Point Pleasant, N.J. 08742; Sheldon Parker, 365 St. Nicholas Ave., Haworth, N.J. 07641

[ * ] Notice: The portion of the term of this patent subsequent to Feb. 3, 2004 has been disclaimed.

[21] Appl. No.: 10,509

[22] Filed: Feb. 3, 1987

Related U.S. Application Data

[63] Continuation-in-part of Ser. No. 573,958, Jan. 26, 1984, Pat. No. 4,640,225, which is a continuation-in-part of Ser. No. 315,307, Oct. 27, 1981, Pat. No. 4,469,046, which is a continuation-in-part of Ser. No. 909,256, May 24, 1978, abandoned.

[51] Int. Cl.$^4$ ............................................. A01K 67/00
[52] U.S. Cl. .................................................... 119/1
[58] Field of Search ..................... 119/1; 229/186, 181, 229/198; 220/403, 404, 405, 406, 407

[56] References Cited

U.S. PATENT DOCUMENTS

| | | | |
|---|---|---|---|
| 1,880,191 | 8/1927 | Bigelow | 229/198 X |
| 3,140,037 | 7/1960 | Baum et al. | 229/186 X |
| 3,752,121 | 8/1973 | Brazzell | 119/1 |
| 3,927,823 | 12/1975 | Persson | 229/186 X |
| 3,965,863 | 6/1976 | Scott | 119/1 |
| 4,291,826 | 9/1981 | Swanson | 229/186 X |

Primary Examiner—Robert P. Swiatek
Assistant Examiner—R. Thomas Price
Attorney, Agent, or Firm—Sheldon H. Parker

[57] ABSTRACT

The combination of a disposable self supporting structure, sorbent pad laminate and litter for the collection of animal urine. The self supporting structure has a base and wall. The sorbent pad laminate includes a moisture impermeable bottom sheet layer in contact with the base and walls, an intermediate sorbent layer of material having a high absorbency capacity for urine, a top claw resistant screen and litter granules. The screen is a urine permeable, flexible member of material which is substantially inert to urine. The screen is formed of strands which are bonded at their intersections and have sufficient tear strength to withstand the clawing action of a cat. The screen must also have sufficiently small hole size to protect the sorbent layer and sheet layer of moisture impermeable material from being torn by animal claws. The bottom sheet layer and top screen are bonded to each other along at least a substantial portion of the screen's periphery. The self supporting structures are manufactured from disposable materials and can be used with the aforenoted sorbent pad laminate or a modified sorbent pad. The modified sorbent pad includes the bottom sorbent layer and screen which have been affixed to the self supporting structure. The self supporting structure in this embodiment must be coated with or manufactured from a moisture impermeable material.

28 Claims, 6 Drawing Sheets

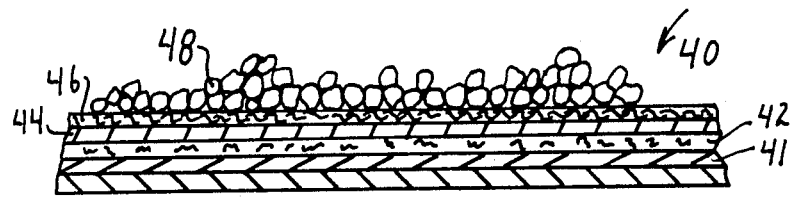
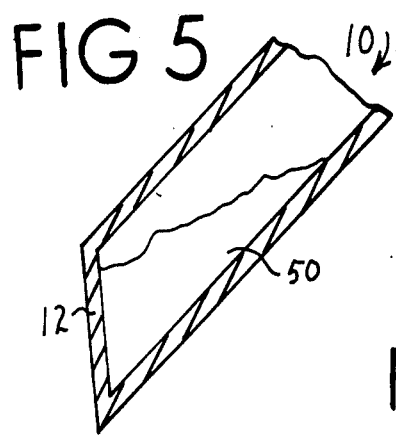
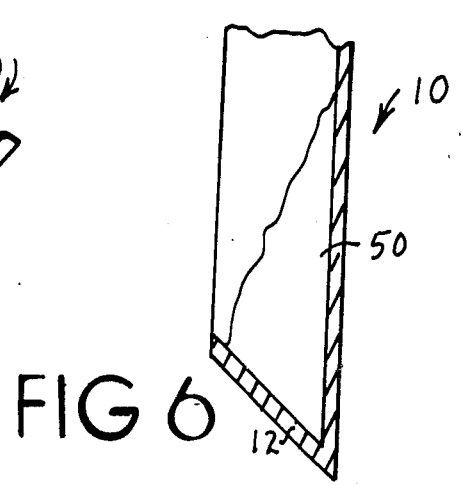
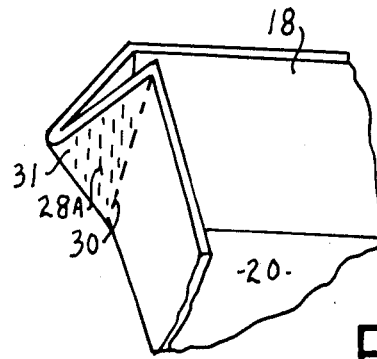
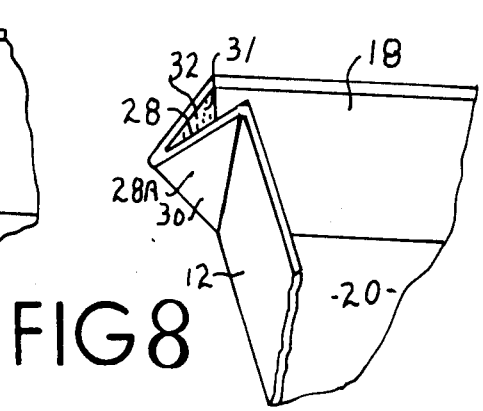

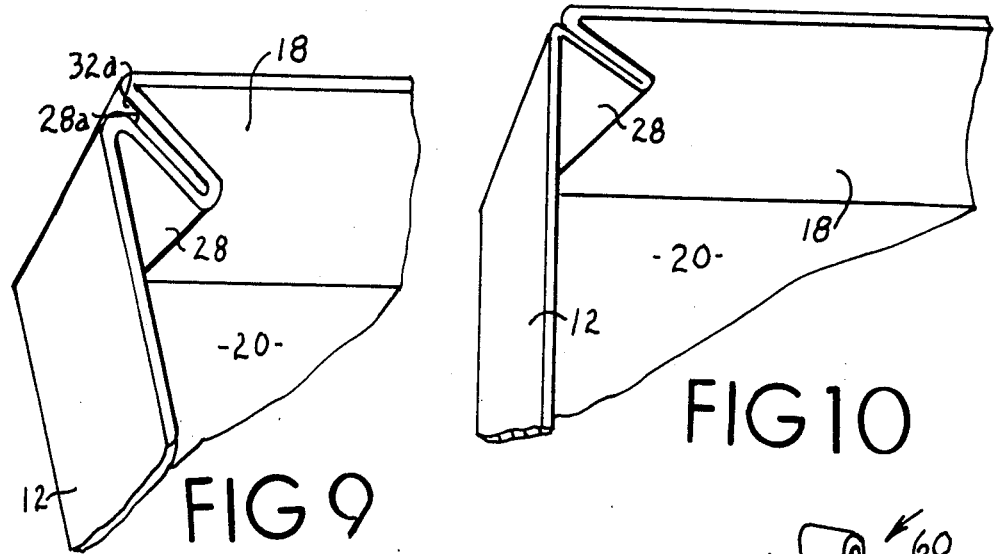
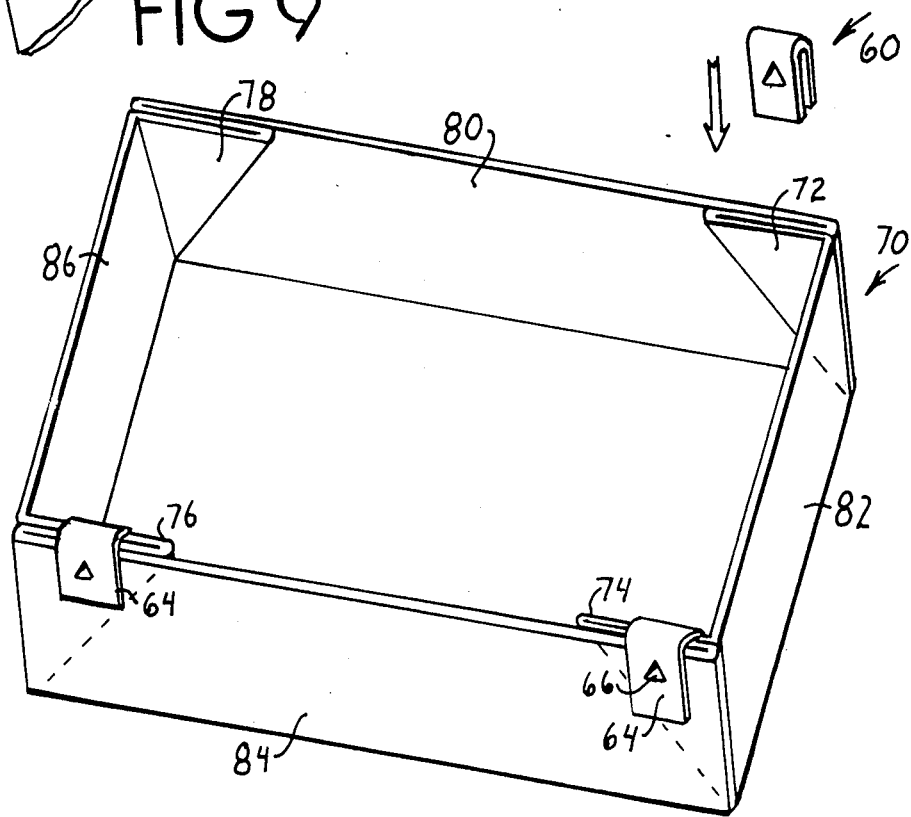

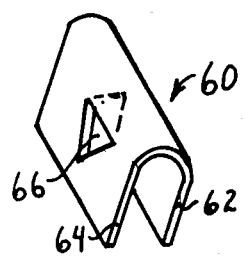
FIG 11
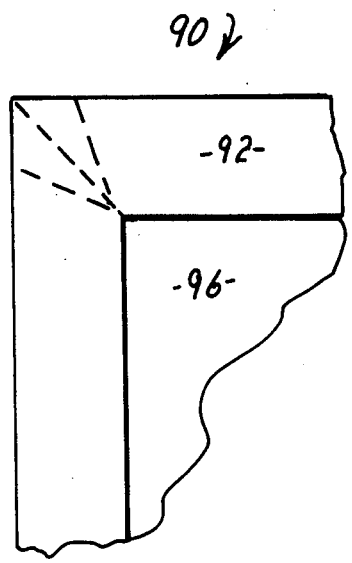
FIG 13
FIG 14
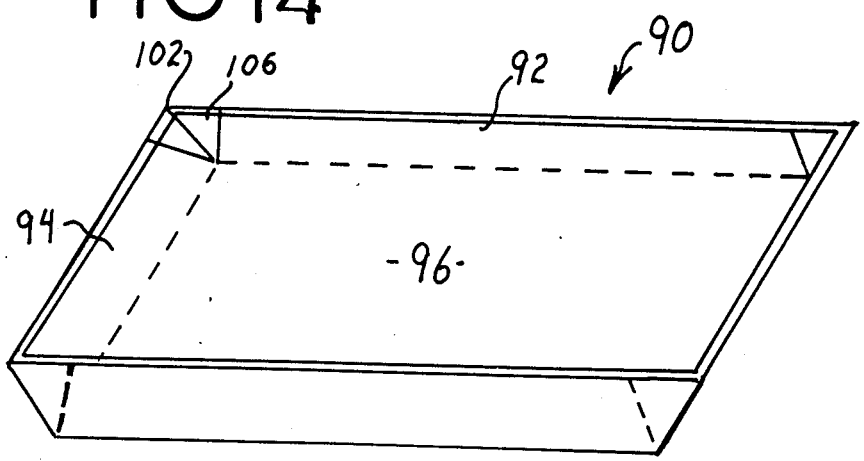
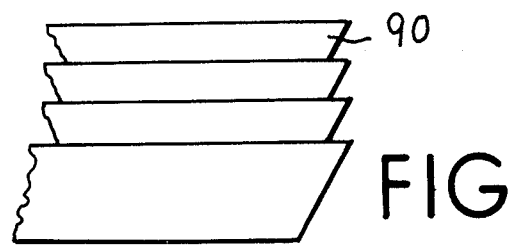
FIG 15

CARDBOARD CONTAINER WITH LITTER PAD

CROSS REFERENCE TO RELATED APPLICATION

This application is a continuation-in-part of application Ser. No. 573,958, filed Jan. 26, 1984, issued as U.S. Pat. No. 4,640,225 on Feb. 3, 1987, which application is a continuation-in-part of Ser. No. 06/315,307 filed Oct. 27, 1981, now U.S. Pat. No. 4,469,046 issued Sept. 4, 1984 and which was a continuation-in-part of application Ser. No. 909,256, filed May 24, 1978, now abandoned, the subject matter and description of which is incorporated herein by reference thereto, as though set forth herein in detail.

BACKGROUND OF THE INVENTION

Field of the Invention

This invention relates to improvements in a unique door preventing, disposable, sorbent pad-liner for an animal litter unit, and more particularly to an improved combination of mesh screening and sorbent padding with a plastic liner to be utilized in combination with the described custom box or independent holders.

Brief Description of the Prior Art

Many domestic animals frequently use litter boxes for the elimination of body wastes. The boxes are usually filled with various kinds of sorbent granular materials such as sand, cat litter and the like, and must be periodically emptied and cleaned, which are somewhat objectionable tasks, since the sorbent granular material must be replaced and the boxes cleaned each time.

Cats, being the most frequent users of litter boxes, present a further problem in that the urine of the feline contains the highest content of urea which, when allowed to stand for any length of time in any litter material, releases an ammonia odor. This odor is one of the more objectionable factors in the ownership of a cat.

In order to eliminate the odor caused by cat urine, the litter box must be changed frequently, this being an expensive, laborious and messy job.

Many patents have issued on devices for the indoor use by cats, such as U.S. Pat. No. 3,233,588. The invention disclosed in this patent employs the use of a screen which is placed on top of the cat litter. This patent does ease the problem of animal excrement, by merely lifting the screen and disposing of the feces lying on top, it does not however, contend with the problem of the odor created by the urine. The unit must be periodically emptied of its absorbent granules and thus only partly contents with the elimination of the mess and labor involved. U.S. Pat. No. 3,809,013 is similar, except that a stack of liners is placed under the litter. When the litter becomes soiled, the liner is lifted, the litter filters through screen covered holes in the center of the liner and the litter is reused with the next liner. Again, the excrement is disposed of neatly, however the odor problem remains.

U.S. Pat. No. 3,752,121, Brazzell, discloses a tray which holds a absorbent mat covered with artificial grass. "Below the artificial grass 31 and its backing sheet 32 there is provided a liquid absorbing pad 33 which may be composed of a plurality of layers of absorbent paper and/or a pad of absorbent fibers to absorb any liquid which seeps through the apertures in the artificial grass backing sheet." The Brazzell patent also recommends using a deodorizer after the animal has used the unit (deodorizer included with the unit at time of purchase). The purpose of the Brazzell absorbent layers is to hold the urine, encasing it between a bottom "impervious layer" and a top "non absorbent or impervious layer" of artificial grass. The trapment of the urine allows for bacteria to grow, causing odor. This bacteria growth prevents use of the pad for long periods of time.

U.S. Pat. No. 3,284,273 discloses an absorbent pad which can be used in combination with animals. Although this pad does contain sorbent capabilities, the odor from the urine of the animal is trapped, much as in the standard cat litter. The pad is not designed for repetitive, long term use in a cat box but rather to retain the urine in a disposable pad, by mopping up pools of urine left on floors or in cages, etc.

U.S. Pat. No. 3,476,083 discloses the use of deodorizing substances which are placed in the bottom of the receptacle. A screen is placed a short distance above, on which lies the standard kittly litter. The upper compartment receives the solid and liquid excreta, retains the solids and absorbs the bulk of the liquid allowing the excess liquids to drain through to the lower compartment. Although providing some neutralizing of the ammonia odor by deodorizing the urine which cannot be absorbed by the litter, it does not provide an effective means for deodorizing the bulk of the urine which has been trapped in the litter. The disposal of all the litter creates a substantial expense to the owner and the cleaning of the lower compartment would be unpleasantly laborious and rather messy. The spilling of the deodorizing substances (lime is suggested) would be objectionable as well as possibly harmful to the person handling the container if by chance some of the chemical substance was to come in contact with the skin.

While many additional patents could be cited regarding other variations of disposal systems, types of granular litter and containers none of these patents overcome both the problem of odor and easy, economical and convenient disposal and replacement.

SUMMARY OF THE INVENTION

In the instant invention the foregoing problems are overcome and an easy to use, odorless, disposable sorbent pad and animal litter box are provided. The odorless animal litter box includes a box-like container formed of a cardboard like material, hardboard, corrugated paper board or similar material; the container can be coated so as to make it impervious to liquid. The advantage of a combination system is that not only is the litter pad disposable, but the container itself also can be disposed of when the system has completed its useful life. The sorbent pad structure includes a protective screening and a moisture impermeable liner.

BRIEF DESCRIPTION OF THE DRAWINGS

The advantages and objects of the invention will become apparent and the invention will be more fully understood from the following specification, particularly when read in conjunction with the drawings, wherein:

FIG. 4 is a cut away view of the container of FIG. 1 with a litter pad;

FIG. 5 is a partial side view of the assembled unit of FIG. 1 tipped at a 45 degree angle;

FIG. 6 is a partial side view of the assembled unit of FIG. 1 tipped at a 90 degree angle;

FIG. 7 is a perspective view of an adhesive securing means for the corners of the instant invention;

FIG. 8 is a perspective view of an additional adhesive securing means for the corners of the instant invention;

FIG. 9 is a cutaway view of an additional embodiment of the instant invention;

FIG. 10 is a cutaway view of an additional adhesive securing means;

FIG. 11 is a perspective view of a securing clip of the instant invention;

FIG. 12 is a perspective view of the embodiment of FIG. 9 secured by use of the securing clip;

FIG. 13 is an exploded fragmentary view of a pre-marked container forming sheet of the instant invention;

FIG. 14 is a top perspective of the assembled box of FIG. 13;

FIG. 15 is a partial side view of the boxes of FIG. 13 stacked;

DETAILED DESCRIPTION OF THE INVENTION

Figure 1:
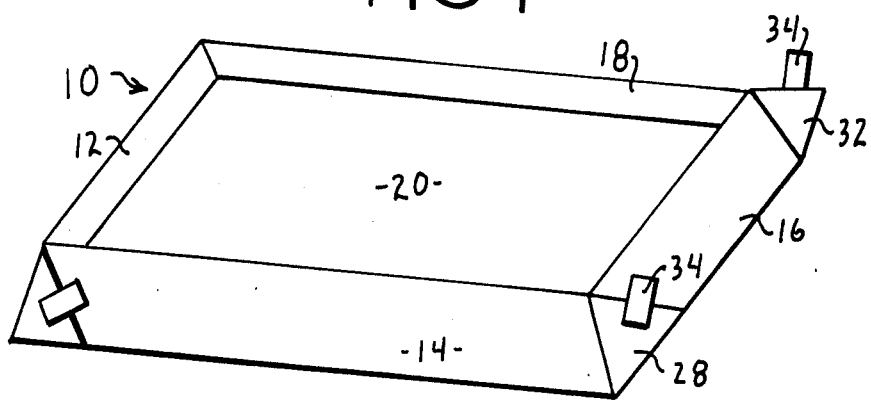
FIG. 1 is a top perspective of a partially assembled unit in accordance with the present invention.

In order to provide a clear understanding of the instant invention, the various aspects of the invention are hereinafter described in detail.

GRANULAR MATERIAL

The granular material is employed in the instant invention is utilized to satisfy the digging instinct of the animal and therefore need not provide absorptive qualities. Consequently, inexpensive materials, such as clay, can be used in accordance with individual preferences. Unlike the commonly employed systems in which the granular material must be used in quantity to provide the required absorptive qualities and digging qualities, minimal quantities of the granular material can be used, as described herein. The absorption quality of the layer 24 can provide the total or the predominant desiccation effect.

The litter material is commonly in granular form and must be in moisture transfer contact with the underlying sorbent material so that the urine can be drawn from the litter material into the sorptive layers. The use of a surfactant on the screen material can enhance the moisture transfer capability of the screen and is essential in combination with hydrophobic or low hydrophilicity materials. The particle size distribution can range between 5.6 to 1 mm, corresponding to U.S. Series Standard Sieve opening #3½ to #18. Smaller particles exist within the litter down to the size of dust, but do not adversely effect the primary function of the particles or adversely effect the absorptive material. Transport of the liquid across the screen can actually be enhanced by the presence of the small particles which are aesthetically undesirable but functionally acceptable.

ABSORBENT UNIT

The absorptive elements can be any material such as paper, tissue, pulp starch and related polymers, etc. which can disperse the liquid quickly, thus providing a large surface area for evaporation of moisture. In order to maintain a moisture free environment, it is necessary to evaporate from 5 to 20 ml. of liquid each time the system is used by the cat.

Examples of sorbent materials are those manufactured by Dow Chemical and marketed under U.S. Pat. No. 4,117,184. The instant patent application incorporates by reference thereto, as though set forth in detail herein the description in U.S. Pat. No. 4,117,184 of a product commonly identified as a super sorbent and sold by Dow Chemical Company under the designation DWAL 35 R. The Dow Chemical product is available as a laminate which includes at least a tissue layer and a polymer film layer. The Dow Chemical laminate has an indicated minimum liquid absorbency capacity of 28 grams per gram of laminate.

Alternatively, the super sorbent can be a material such as the National Starch and Chemical Corporation product sold under the registered trademark Permasorb. The National Starch product is a hydrophilic polymer which has the ability to absorb and hold urine. There is a significant reduction in urine odor and pH level in the presence of Permasorb.

Another example of an sorbent is the material sold under the trademark Water-lock by Grain Processing Corp.

A ground paper pulp absorptive material has been found to provide a combination of high absorbency, high surface area and low cost. The large surface area provides for rapid urine evaporation and consequently is extremely effective in odor prevention.

Toxic chemicals or biologically active ingredients are not only unnecessary but preferably are avoided. U.S. Pat. No. 4,494,482 assigned to Proctor and Gamble relies on the use of 5000 to 30,000 ppm of a halogenated aromatic hydrocarbon bacteriostat in an sorbent pad to effectively control odor development. It has been found that if the sorbent material has the ability to absorb the urine, distribute the urine rapidly throughout its mass, and evaporate the urine faster than the bacteria can act on the urine, then the additives are not only unnecessary but undesirable.

Bacteria from the feces cannot grow in the absorptive layer because they are dried out and die or become dormant. It is the bacteria which is capable of breaking down the urine which cause the strong volatile odor commonly associated with cat litter boxes, the dry environment of the sorbent material effectively prevents odor. The high absorption capacity of the super absorbent polymers, such as available from Dow Chemical, do not provide an advantage over a pulp fiber, due to the high rate of evaporation of urine from the fiberous material. As previously stated, the instant invention requires substantially less granular material for each use and requires fewer changes, saving further on granular use. In the prior art type of litter box, the litter consumption is greater than in accordance with the present invention.

| Ordinary Litter Box | System of the Invention |
|---|---|
| GRANULAR MATERIAL CONSUMPTION (POUNDS PER MONTH) | |

-continued

|  | Ordinary Litter Box | System of the Invention |
|---|---|---|
| 1 cat | 40 | 2 to 4 |
| 2 cats | 60 | 2 to 6 |
| 3–5 cats | 80 to 100 | 20 |
| TIME PERIOD FOR CHANGING THE LITTER GRANULES (Number of changes per month) | | |
| 1 cat | 15 | 1 to 2 |
| 2 cats | 15 to 18 | 1 to 2 |
| 3–5 cats | 30 | 4 |

The amount of litter which is used can be decreased with time in order to permit the cat to become accustomed to the low litter level. In some cases, cats can be trained to the pads without litter. Whereas, in conventional litter boxes, two to three inches of litter are required, in accordance with the present invention less than one inch of litter, and preferably no more than about one half inch, provides the desired results.

SCREEN MATERIALS

A flexible, screen like mesh or permeable or semipermeable membrane is utilized to prevent the animal from clawing through to the sorbent layer. The screen material must, therefore, exhibit sufficient strength to withstand the clawing action of the animal. Even though the screen is disposable, it is critical that the screen be made of a material which is relatively inert to urine thereby preventing rapid corrosion of the screen material, resultant odors and chemical activity. Some of the preferred materials of construction include polyester and polypropylene. Particularly in the case of hydrophobic materials, a surfactant must be used to prevent the screen from acting as a liquid transfer barrier. While the particular surfactant which is used is not narrowly critical, by way of illustration the surfactant can be a non-ionic surfactant such as Tergitol. The mesh-like screen or netting 19 can be formed by the spun bonding process as well known in the art. While it would appear that screens formed by this process would not be capable of providing the required claw rip resistance without resorting to such a high material density that moisture transfer subsequent evaporation would be either precluded or severely restricted and cost would be excessive, it has been found that a critical balance of properties can be achieved. From the stand point of rip resistance, the required tensile strength in lbs./sq.in., must be at least 20 and can be as high as 150 or more in both the warp (length) and filling direction. From the stand point of the manufacture of the screen-absorptive layer combination, a minimum warp strength of 20 is also required. The preferred minimum strength is at least 50. The thread size preferably rages from 30 to 80 denier.

The mesh count, in number of squares per square inch, can range between 850 and 175. At the upper limit, the hole size is so small as to interfere with liquid transfer and subsequent evaporation. At the lower limit, the hole size is so large that the protective ability becomes inadequate. The lower plastic liner must be protected from the cats claws since even pin holes can cause urine to seep under the liner and cause a severe odor problem. Similarly the absorptive layer must be protected from the tearing action of the claws. For example, the screen of Vander Wall, U.S. Pat. No. 3,476,083, would be totally inoperative to prevent tearing of the absorptive layer or the plastic moisture barrier.

The use of a loose screen-like fabric is unacceptable because the mesh can be varied as a result of the force of the animal's claws. Accordingly, the reference to mesh size is intended to indicate the effective size under actual use conditions rather than a 'temporary' size which can be readily altered by the animal.

Structural integrity of the screen can be achieved by any of the known means which yields bonding of the strands at their interstices, as for example, through fusion of strands at the cross-over points or through the weaving or knitting of the strands or any other means which precludes relative movement of the strands.

The disposable litter box as disclosed herein can be constructed from any paper or plastic based material which is inexpensive enough to be sold at a price which the consumer would consider "disposable". In addition to price, the material must have rigidity and thickness sufficient to be self-supporting and perform the functions as disclosed herein. For economy, fiber board is desirable because of its availability and its comparatively low cost. The fiber board may consist of jute, manila, news, chip or other like substances and the texture thereof should be such that it will not crack when folded.

In one form the container can be coated with a material similar to that used for milk cartons and dairy products. As well known in this area of technology, the paperboard can be coated with a wax, thermoplastic coating, quick drying solvent or polymer, such as polyethylene, to achieve maximum hydrophilicity in the absorbent pad and be a thorough water barrier. The use of a thermoplastic, such as Vinylite or the like, applied to the inner side, and a coating of alkyd or other thermosetting material applied to the outer side, or both sides in thermoplastic, not only serves to render the paper non-sorbent but also as an adhesive and sealing medium under heat and pressure.

FIG. 1 illustrates one embodiment of the set up disposable litter container 10. It is preferable that the side walls of the disposable litter container 10, are inclined inwardly so as to prevent litter of the granular type typically used in cat litter boxes from being kicked out of the box by the cat during the scratching action. It is well known that some cats not only scratch at the litter, but dig and throw the litter around. The inclined side walls of the container tend to limit the amount of litter which is thrown from the container as compared to straight walls or the commonly used outwardly inclined side walls. A further advantage of the inwardly inclined walls resides in the fact that the unit of the instant invention has very little weight as compared to conventional plastic containers. Thus, if a cat steps on the side wall of the container, putting a downward force on it, it is possible for outwardly inclined walls to spill litter from the container or for the container to actually be lifted by the force applied by the cat. In contrast, inwardly inclined walls merely drop inward toward the container and rebound when the weight of the cat is removed. In this embodiment a lighter weight paper board can be used as the walls are not required to remain vertical under a cat's weight.

Figure 2:
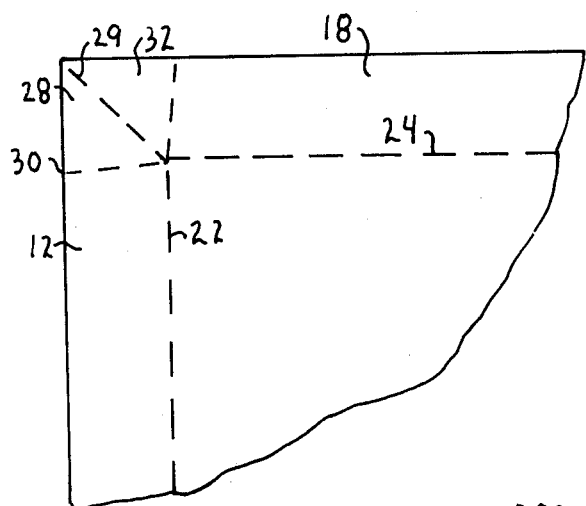
FIG. 2 is an exploded fragmentary view of a premarked container forming sheet of the instant invention.
Figure 3:
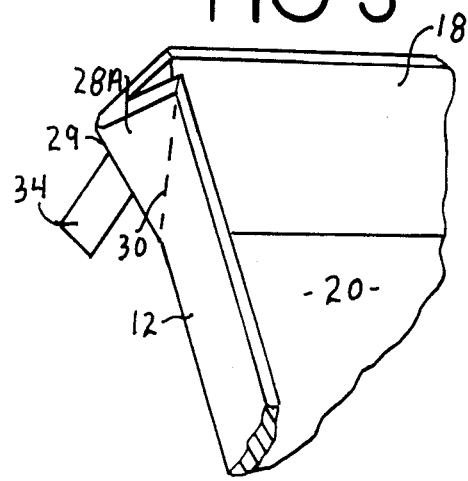
FIG. 3 is a perspective view of the tape securing means for the corners of the instant invention.

FIG. 2 illustrates the unfolded prescored blank of FIG. 1. To set up container the end wall 12 and side wall 18 are folded at fold lines 22 and 24 so as to be at right angles to the base 20. This forces the triangular flaps 28 and 32 to extend away from the center of the box, folding at the fold lines 26, 29 and 30 as shown in FIG. 3. The triangular flap 28 is then folded at fold line 30 so that the outer side 28A is folded onto the end wall 12 and secured thereto by use of adhesive tape 34.

The placement of the fold lines 26, 29 and 30 are the determining factors in whether the walls 12, 14, 16 and 18 fold inward, as disclosed in FIG. 1, vertical or slanted outward.

In the preferred embodiment of the disposable litter container 10, the container is laminated and the sorbent pad is adhered directly onto the laminated box at time of manufacture. This is illustrated in FIG. 4 wherein the disposable litter box 40 is coated with a laminate 41. The sorbent pad layers are then adhered directly onto the laminate, the sorbent layer 42, protective layer 44 and screen 46. The litter 48 can then be added directly thereto. The moisture resistance laminate sheeting is not required herein since the laminate 41 on the disposable litter box 40 will prevent leakage. The sorbent pad layers can be adhered to the litter box 10 by any means known in the industry which is suitable to animal usage and discussed further herein. The disposable litter box 40 provides the advantage that the entire unit (with or without litter) is purchased and disposed of at one time. The elimination of the moisture resistant laminate sheeting reduces the cost of the sorbent pad unit, thereby compensating for the added expense of the laminate on the box.

As an alternate embodiment, the disposable litter carton can be manufactured without the lamination and the sorbent pad can be placed in the bottom of the disposable litter container 10 and secured thereto by adhesive tapes.

FIGS. 5 and 6 illustrate the advantages of the inwardly slanted walls. In FIG. 5 the disposable litter box 10 is positioned at approximately a 45 degree angle. The loose litter 50, although flowing toward the end wall 12, does not spill over because of the slant of the end wall 12. The angle of tilt has been increased in FIG. 6 to almost 90 degrees and, although close to the edge, the litter 50 does not spill out of the disposable litter box 10.

FIG. 7 shows an alternate securing means for the disposable litter cartons disclosed herein. The disposable carton is initially set up as previously described herein, however instead of using the tape 34, adhesive 31 is applied at time of manufacture to the triangular flap 28a. The triangular flap 28a is then folded onto end wall 12. To prevent adhesion prior to set up, the triangular flap 28a can have a quick release cover, be water soluble or any other means as known in the prior art. An alternative placement of adhesion is disclosed in FIG. 8 wherein the adhesive 31 is placed on the triangular flap 32 and/or triangular flap 28. At the time of set up the two triangular flaps 32 and 28 are pressed together forming the closing corner. If so desired, adhesive can be placed on triangular flap 28A which can then be folded onto end wall 12 as previously described. Again, the adhesive can be any of the types previously described.

FIG. 9 illustrates another configuration of the disposable litter box. The box as illustrated uses conventional straight sides and, therefore, must be manufactured in a heavier weight material to prevent the crushing of the sides when stepped on by an animal. An alternate folding configuration is also disclosed wherein adhesive is applied to triangular flaps 32a and 28a at time of manufacture. When setting up the container the triangular flaps 32a and 28a are prepared for adhesion as per the manufacturer's directions and pressed together. As shown in FIG. 10, the two triangular flaps 28 and 32 are not large enough interfere with use of the litter box by the animal.

FIG. 11 illustrates the closing clip 60. The closing clip 60 is formed in a horseshoe configuration with clip sides 62 and 64 of a length less than the depth of the disposable litter box 70 of FIG. 12. The type of clip used herein is known and used commonly to prevent clothing or fabric from sliding off a hanger. The disposable litter carton 70 is manufactured as previously described in the embodiments herein, however no adhesive or tape closures are used. After folding as described in the above embodiments, triangular flaps 72, 74, 76 and 78 are folded so as to be flush with their corresponding walls. The closing clip 60 is then placed over the edge with the clip sides 64 and 62 on either side of the carton, pinning triangular flaps 72, 74, 76 and 78 against their corresponding carton sides. The fastening pin 66 prevents the closing clip 60 from sliding off by puncturing the box 70. The triangular flaps 72, 74, 76 and 78 can be folded on the inside of the disposable litter carton 70 as illustrated in FIG. 12 or if so desired can be folded on the outside of disposable litter carton 70 as illustrated in FIG. 1.

FIG. 13 illustrates another embodiment of the instant invention wherein the fold line 98 and the fold line 100 of the disposable litter carton 90 are set closer to the center fold line 102. When the disposable litter carton 90 is set up, the carton end 94 and carton side 92 are slanting outward from the base 96 at a greater than 45 degree angle. The disposable litter carton 90 can be assembled as previously described, using any of the foregoing adhesives or tapes. The disposable litter carton 90 requires a heavier gauge material than does the disposable litter carton 10 of FIG. 1 as it must be able to retain its configuration when stepped on by an animal. The advantage of the outward slanting carton side 92 and carton end 94 is their allowing the disposable litter carton 90 to be stacked with one another, as illustrated in FIG. 15. This provides easy storage for present up cartons either at home or in the store.

Figure 16:
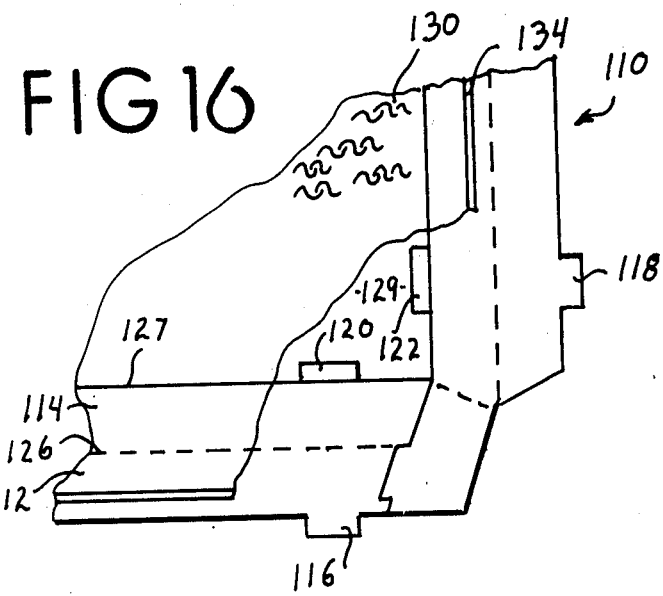
FIG. 16 is a exploded fragmentary view of an additional embodiment of the instant invention.
Figure 17:
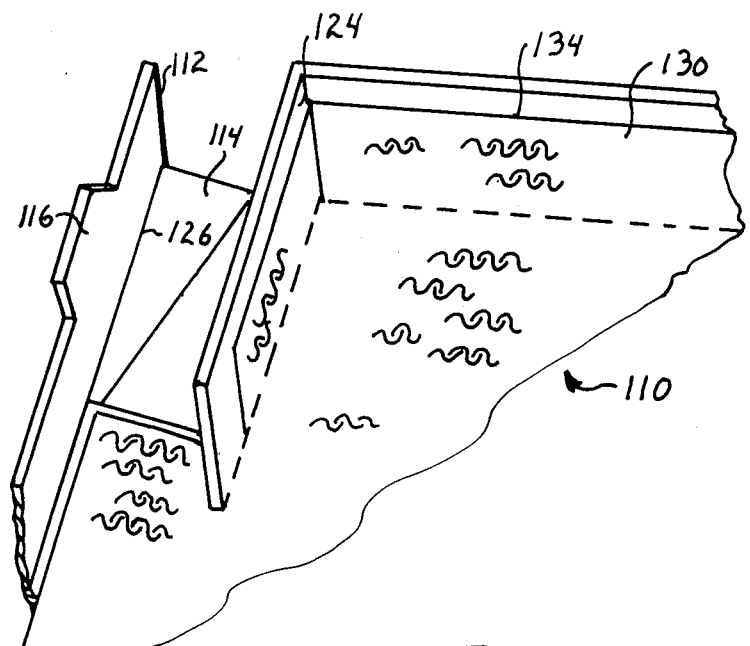
FIG. 17 is a fragmentary view of the embodiment of FIG. 16 partially assembled.
Figure 18:
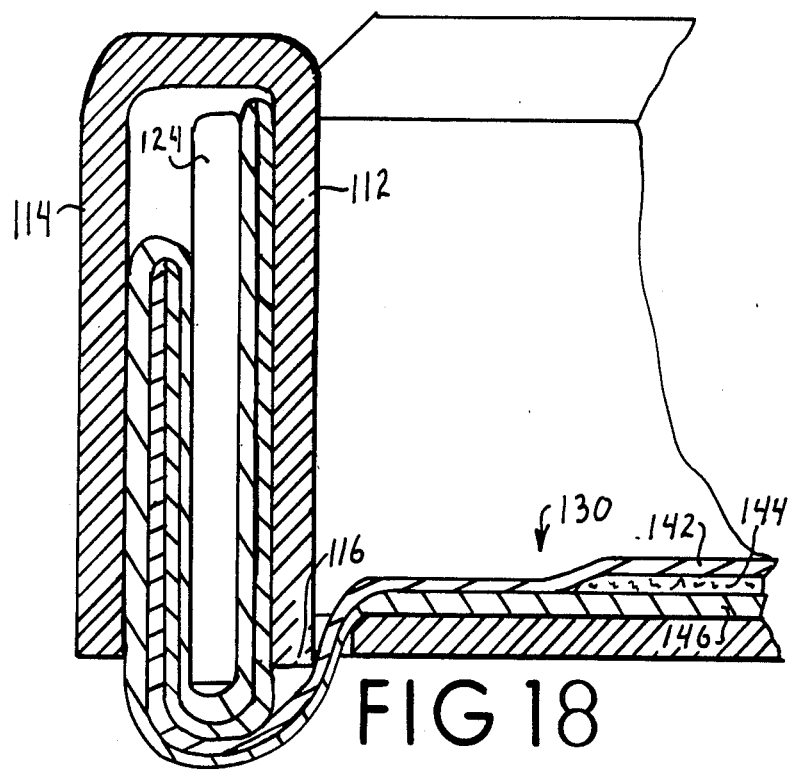
FIG. 18 is a cutaway view of the locking system of the carton of FIG. 16.
Figure 19:
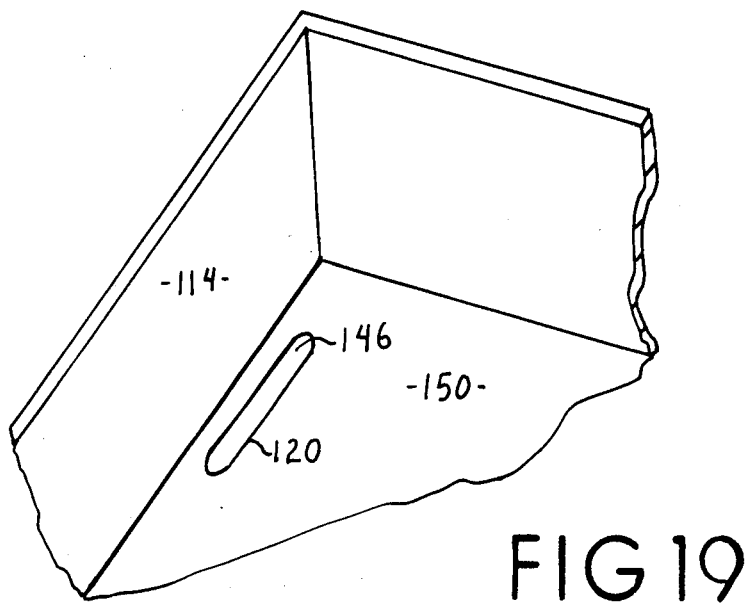
FIG. 19 is a partial perspective of the bottom of the carton of FIG. 16.

FIG. 16 illustrates a premarked carton of an additional embodiment of the instant invention. In the embodiment described herein, the loose sorbent pad 130 shown in FIG. 18, is used in conjunction with a laminated cardboard. It should be noted, however, that the sorbent pad 130 can be attached to the disposable litter carton 110 at the time of manufacture or, as an alternative, a non-laminated carton material used and the loose sorbent pad 130 with a protective plastic sheeting used. The disposable litter carton 110 can be manufactured from a heavy gauge material, such as corrugate, thereby forming a rigid, long lasting unit. Prior to setting up the disposable litter carton 110 the sorbent pad 130 is placed, screen side up, over the disposable litter carton 110. The absorbent pad must be substantially larger than the size of the base 129, approximately the dimension of the outside walls. After the placement of the sorbent pad 130, it should be folded over onto itself between the fold line 126 and the fold line 127. The disposable litter carton 110 is set up by folding the corner flap 124 and its counterparts at each corner, inward onto the outer carton side 114 so as trap the folded portion of the sorbent pad 130 between the outer carton side 114 and the corner flap 124. The corner flap 124 prevents the walls from separating as well as preventing leakage at the corners. The inner carton side 112 and outer carton side 114 are then folded at the fold line 127 so as to be at right angles with the base 129. The remaining portion of the folded sorbent pad 130 is then placed against the folded corner flap 124; the inner carton side 112 is then folded at fold line 126 and the locking tap 116 is placed in the locking tab receiving notch 120. FIG. 17 illustrates the disposable litter carton 110 partially set up. The corner flap 124 and its counterparts, have been folded so as to be locked in between the outer carton side 114 and the inner carton side 112. The inner carton side 112 would then be folded at fold line 126 over the corner flap 124 and the locking tap 116 locked into the locking tab receiving notch 120. This procedure is repeated at the opposite side of the disposable litter carton 110, forming a rigid, ready to use unit. The locking tab 116 holds in place the sorbent pad 130 by pinning it between the walls and in the notch. This is better illustrated in FIG. 18 wherein the path of the sorbent pad 130 is shown locked in. The sorbent pad 130, with its screen 142, protective layer 144, and sorbent layer 146, is shown with its folded portion trapped between the outer carton side 114 and the corner flap 124 and its remaining portion trapped between corner flap 124 and inner carton side 112. As shown in FIG. 19, the sorbent layer 146 is pushed through the locking tab receiving notch 120 by the locking tab 116.

By inserting the locking tab 113 and locking tab 118 into the locking tab receiving notches 120 and 122, movement of the side walls is restricted within the locking tab receiving notches 120 and 122, while the folding tends to reinforce the outer carton side 114 and inner carton side 112, thus producing a self supporting structure without the necessity of using a heavy weight board. If a long term litter carton is desired, a corrugated material can be used in conjunction with the sorbent pad with plastic liner. A carton of this weight material can be used repeatedly, replacing the sorbent pads as needed.

Because the embodiments disclosed herein can be sold in a flat form the space required for storage of the units is kept to an absolute minimum and the units can be stacked with no dead space between them. Additionally the sale of "grouped" units (i.e. Buy Three, Get One Free) is easier with either the flat or nestled containers.

In the event an absorbent pad has been bonded directly onto the carton forming material forming any of the embodiments of disposable litter container, as described herein, the assembly of the disposable litter container will provide an immediately usable litter unit. In this form of all embodiments, the urine absorbent fiber material is bonded directly to the laminated paperboard container without the use of an additional moisture impermeable barrier. In such a case, the protective screen would be glued at at least two peripheral edges directly to the paperboard container. If the container is made of a corrugated paper like material, the protective screen must be of a heavier weight than would otherwise required to effectively prevent the claws of a cat from puncturing the moisture impermeable layer which is in direct contact with the paperboard container. The soft nature of the paperboard makes it easier for the cat to puncture the protective moisture impermeable layer than would be the case where the container is of a rigid material. It is thus evident that the use of a milk carton like material has the advantage of resisting the puncturing action of the claws of a cat more effectively than the moisture impermeable plastic sheet and thus improves the function and eliminates the need for this element in that the container itself becomes the moisture impermeable barrier layer.

Many polymer products can be used for the litter containers instead of the paperboard. As with the paperboard the pad without the impermeable liner can be bonded directly onto the plastic or the full pad, including liner, can be removably affixed to the container.

It should be noted that many of the disclosures herein can combined with other embodiments other than described herein. The adhesive, tape or clip means can be used with any of the containers requiring closure means. All of the embodiments herein can be formed in the coated or uncoated paperboard, pad affixed at time of manufacture or added at time of use. To described all combinations which are possible by combining all of the disclosures herein would be too lengthy.

What is claimed is:

1. The combination of a self supporting structure and sorbent pad laminate and litter means for the collection of animal urine wherein said self supporting structure is made of a disposable material and has a base and walls; said sorbent pad laminate and litter means including
   a. a bottom sheet layer of moisture impermeable material, said sheet layer being in contact with said base and walls;
   b. an intermediate sorbent layer of material having a high absorbency capacity for urine and a high surface area for evaporation of said urine;
   c. a top claw resistant screen means, said screen means being a urine permeable, flexible member of material which is substantially inert to urine, formed of strands bonded at their intersections and having sufficient tear strength to withstand the clawing action of a cat and sufficiently small hole size to protect said sorbent layer and said sheet layer of moisture impermeable material from being torn by animal claws without inhibiting evaporation, said bottom sheet layer and said top claw resistant screen means being bonded to each other along at least a substantial portion of the screens periphery; and
   d. litter granules.

2. The litter container of claim 1 wherein said self supporting structure has four walls and a substantially rectangular base.

3. The litter container of claim 1 wherein said disposable material is covered with a moisture impermeable material.

4. The litter container of claim 3 wherein said disposable material is made from a moisture impermeable material.

5. The litter container of claim 1 wherein said litter granules overlie said top claw resistant screen means.

6. The litter container of claim 5 wherein said litter granules are substantially non-urine sorbent.

7. The litter container of claim 1 wherein said self supporting structure is a paperboard blank having a first edge, a second edge, a third edge and a fourth edge, wherein each of said edges forms a corner at the point where each of said edge meets the adjacent edge, and wherein
   a first region has a first fold line to form a first point proximate said second edge to a second point proximate said fourth edge, the distance between said first point and said second edge and between said second point and said fourth edge being equal to the distance between said first fold line and said first edge;

a second region has a second fold line from said first point to a third point proximate said third edge, the distance between said first point and said first edge and between said third point and said third edge being equal to the distance between said second fold line and said second edge;

a third region has a third fold line from said third point to a fourth point proximate said fourth edge, the distance between said third point and said second edge and between said fourth point and said fourth edge being equal to the distance between said third fold line and said third edge;

a fourth region has a fourth fold line from said fourth point to said second, the distance between said fourth point and said third edge and between said second point and said first edge being equal to the distance between said fourth fold line and said fourth edge.

8. The litter container of claim 7 further comprising a set of corner folds, said corner folds having a first corner fold, a second corner fold and a center corner fold between said first corner fold and said second corner fold, wherein said first corner fold extends from said first point to said first edge, said center corner fold extends from said first point to said corner, and said second corner fold extends from said first point to said second edge.

9. The litter container of claim 8 wherein said first corner fold and said second corner fold extend from said first point at an angle greater than 45 degrees from said center fold.

10. The litter container of claim 8 wherein said first corner fold and said second corner fold extend from said first point at an angle less than 45 degrees from said center fold.

11. The litter container of claim 7 wherein each of said corners having a set of said corner folds.

12. The litter container of claim 11 wherein said self-supporting structure and said sorbent pad laminate are removably secured to one another.

13. The litter container of claim 12 wherein said sorbent pad laminate overlies said base of said said self supporting structure.

14. The litter container of claim 12 wherein said sorbent pad laminate overlies said base and walls of said self supporting structure.

15. The litter container of claim 1 wherein said self supporting structure further comprises fastening means.

16. The litter container of claim 15 wherein said fastening means is U shaped clips, said U shaped clips having a pair of legs.

17. The litter container of claim 16 wherein said U shaped clips have a v-shaped portion cut from one of said pair of legs, said v-shaped portion extending toward the opposite leg.

18. The litter container of claim 15 wherein said fastening means is pressure sensitive adhesive tape.

19. The litter container of claim 18 wherein said pressure sensitive adhesive tape is secured to said self supporting structure proximate said corner fold lines.

20. The litter container of of claim 15 wherein said fastening means is pressure sensitive adhesive.

21. The litter container of claim 20 wherein said pressure sensitive adhesive is applied to said blank between said corner fold lines.

22. The litter container of claim 1 wherein said self supporting structure is a paperboard blank having a first edge, a second edge, a third edge and a fourth edge, each of said edges having a pair of ends;

a first set fold lines, said first set of fold lines having a first side, a second side, a third side and a fourth side;

a second set fold lines, said second set fold lines having a first side, a second side, a third side and a fourth side;

four pairs of insert tabs;

four pairs of tab receiving slots; and a base, said base being formed within said second set of fold lines;

said first set of fold lines being spaced from said edges and said second set of fold lines being spaced from said first set of fold lines;

said pair of ends of said edges being spaced equally from the adjoining edge a distance equal to the distance between said first set of fold lines and said edges;

each pair of said four pairs of insert tabs extend from each of said edges; and said pairs of insert tabs are spaced in from said ends.

23. The litter container of claim 22 wherein said tap receiving slots are on said base and spaced from said second set of fold lines in a position so as to receive said insert tabs.

24. The litter container of claim 22 wherein said disposable material is coated with a moisture impermeable material.

25. The litter container of claim 22 wherein said disposable material is made from a moisture impermeable material.

26. The combination of a self supporting structure and sorbent pad laminate and litter means for the collection of animal urine wherein said self supporting structure is made of a disposable material and has a base and walls and said sorbent pad laminate and litter means includes a. an sorbent layer of material having a high absorbency capacity for urine and a high surface area for evaporation of said urine;

b. a top claw resistant screen means, said screen means being a urine permeable, flexible member of material which is substantially inert to urine, formed of strands bonded at their intersections and having sufficient tear strength to withstand the clawing action of a cat and sufficiently small hole size to protect said sorbent layer and said base from being torn by animal claws without inhibiting evaporation, said base and said top screen means being bonded to each other along at least a substantial portion of the screens periphery; and c. litter granules overlying said claw resistant screen means.

27. The litter container of claim 26 wherein said disposable material is coated with a moisture impermeable material.

28. The litter container of claim 26 wherein said litter granules are substantially non-urine sorbent.

* * * * *